US012772120B2

(12) United States Patent
Fu et al.

(10) Patent No.: US 12,772,120 B2
(45) Date of Patent: Oct. 20, 2026

(54) METHOD FOR NETWORK SLICE HANDOVER AND NETWORK DEVICE

(71) Applicant: GUANGDONG OPPO MOBILE TELECOMMUNICATIONS CORP., LTD., Dongguan (CN)

(72) Inventors: Zhe Fu, Dongguan (CN); Haitao Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 558 days.

(21) Appl. No.: 17/952,610

(22) Filed: Sep. 26, 2022

(65) Prior Publication Data

US 2023/0014464 A1 Jan. 19, 2023

Related U.S. Application Data

(63) Continuation of application No. PCT/CN2020/083253, filed on Apr. 3, 2020.

(51) Int. Cl.
*H04W 36/00* (2009.01)

(52) U.S. Cl.
CPC ... *H04W 36/0033* (2013.01); *H04W 36/0016* (2013.01); *H04W 36/0064* (2023.05); *H04W 36/13* (2023.05)

(58) Field of Classification Search
CPC ............. H04W 36/0033; H04W 36/13; H04W 36/0064; H04W 36/0016; H04W 40/36; H04W 36/362; H04W 36/305; H04W 36/037; H04W 36/00838; H04L 69/322; H04B 17/382; H04B 7/18541
See application file for complete search history.

(56) References Cited

U.S. PATENT DOCUMENTS

| | | | | |
|---|---|---|---|---|
| 2018/0124660 | A1* | 5/2018 | Zhang | H04W 84/02 |
| 2018/0317148 | A1* | 11/2018 | Jin | H04W 36/0033 |
| 2019/0289528 | A1* | 9/2019 | Lou | H04W 36/06 |
| 2019/0306761 | A1* | 10/2019 | Jin | H04W 36/0011 |
| 2020/0008113 | A1* | 1/2020 | Chen | H04W 36/0085 |

(Continued)

FOREIGN PATENT DOCUMENTS

| | | | |
|---|---|---|---|
| CN | 108924884 | A | 11/2018 |
| CN | 110419240 | A | 11/2019 |

(Continued)

OTHER PUBLICATIONS

Communication pursuant to Rule 164(1) EPC for EP Application 20928303.5 mailed Apr. 21, 2023. (19 pages).

(Continued)

*Primary Examiner* — Un C Cho
*Assistant Examiner* — Theodore Im
(74) *Attorney, Agent, or Firm* — Young Basile Hanlon & MacFarlane, P.C.

(57) ABSTRACT

A method and apparatus for network slice handover (HO) are provided. The method includes the following. A target base station receives an HO request transmitted by a source base station. The target base station determines whether to perform slice remapping. A network device, includes a transceiver, a processor; and a memory storing programs which, when executed by the processor, are operable with the processor to perform the method.

17 Claims, 4 Drawing Sheets

(56) References Cited

U.S. PATENT DOCUMENTS

| | | | | |
|---|---|---|---|---|
| 2020/0022033 | A1* | 1/2020 | Wei | H04W 36/0064 |
| 2020/0022061 | A1* | 1/2020 | Jin | H04W 48/06 |
| 2020/0045594 | A1* | 2/2020 | Peng | H04W 76/18 |
| 2020/0059987 | A1* | 2/2020 | Hong | H04W 36/0033 |
| 2020/0280896 | A1* | 9/2020 | Ying | H04W 76/19 |
| 2020/0336957 | A1* | 10/2020 | Wu | H04W 36/00837 |
| 2021/0029597 | A1* | 1/2021 | Xu | H04W 36/0066 |
| 2021/0274407 | A1* | 9/2021 | Wu | H04W 36/304 |
| 2021/0392704 | A1* | 12/2021 | Xu | H04W 48/18 |
| 2022/0124587 | A1* | 4/2022 | Awada | H04W 36/22 |
| 2022/0132386 | A1* | 4/2022 | Park | H04W 36/0016 |
| 2022/0217625 | A1* | 7/2022 | Zhu | H04W 48/18 |
| 2022/0360996 | A1* | 11/2022 | Luo | H04W 36/13 |
| 2023/0015703 | A1* | 1/2023 | Kimba Dit Adamou | H04W 36/0011 |
| 2023/0247716 | A1* | 8/2023 | Hong | H04W 28/0226 |

FOREIGN PATENT DOCUMENTS

| | | | |
|---|---|---|---|
| CN | 110838927 | A | 2/2020 |
| EP | 3592035 | A1 | 1/2020 |
| WO | 2018135992 | A1 | 7/2018 |
| WO | 2018143769 | A1 | 8/2018 |

OTHER PUBLICATIONS

3GPP TSG-RAN WG3 #97-BIS, Prague, Czech, R3-173894, Xn based mobility for slicing across RA, Huawei, Oct. 9-13, 2017. (5 pages).

3GPP TS 38.300 V16.0.0, Technical Specification Group Radio Access Network, NR;NR and NG-RAN Overall Description, Stage 2 (Release 16), Dec. 2019. (10 pages).

3GPP TR 38.832 V17.0.0 (Jun. 2021); Technical Specification Group Ran; NR; Study on enhancement of Radio Access Network (RAN) slicing; Release 17. (31 pages).

International Search Report and Written Opinion with English Translation for PCT Application PCT/CN2020/083253 mailed Dec. 31, 2020. (17 pages).

Extended European Search Report for EP Application 20928303.5 mailed Jul. 24, 2023. (17 pages).

Examination report issued in corresponding European application No. 20928303.5 dated Mar. 7, 2024, 12 pages.

* cited by examiner

METHOD FOR NETWORK SLICE HANDOVER AND NETWORK DEVICE

CROSS-REFERENCE TO RELATED APPLICATION(S)

This application is a continuation of International Application No. PCT/CN2020/083253, filed Apr. 3, 2020, the entire disclosure of which is incorporated herein by reference.

TECHNICAL FIELD

This application relates to the field of communication technology, and particularly to a method for network slice handover (HO) and a network device.

BACKGROUND

During slice handover (HO) in an existing slice technology, an existing HO procedure is that a source base station configures a user equipment (UE, that is, a terminal device) to perform measurement reporting, and transmits an HO request to a target base station based on a reporting result of the UE, where the HO request will carry packet data unit (PDU)-session-related information. The target base station performs access control. If a PDU session in the HO request corresponds to a slice that is not supported by the target base station, the target base station will reject the PDU session.

In the existing slice HO procedure, if the target base station does not support a slice that requires switch by the source base station, the target base station will reject a PDU session corresponding to the slice, which has a technical problem of service discontinuity during slice HO.

SUMMARY

In a first aspect, a method for network slice handover (HO) is provided in implementations of the disclosure. The method is applicable to a target base station. The method includes the following. The target base station receives an HO request transmitted by a source base station. The target base station determines whether to perform slice remapping.

In a second aspect, a method for network slice HO is provided in implementations of the disclosure. The method is applicable to a source base station. The method includes the following. The source base station transmits an HO request to a target base station, where the HO request is used for the target base station to determine whether to perform slice remapping when the HO request is received by the target base station. The source base station receives an HO request acknowledge (ACK) fed back by the target base station, where the HO request ACK contains new-packet data unit (PDU)-session information and/or notifies a data forwarding tunnel for a data radio bearer (DRB) corresponding to a new PDU session.

In a third aspect, a network device is provided in implementations of the disclosure. The network device includes a transceiver, a processor and a memory. The memory is configured to store programs executable by the processor. The processor and the transceiver, when executing the programs, is configured to perform any of the methods for network slice HO described above.

BRIEF DESCRIPTION OF DRAWINGS

The accompanying drawings herein, which are incorporated in and constitute a part of the specification, illustrate implementations consistent with the disclosure, and together with the specification, are intended to explain the principles of the disclosure.

DETAILED DESCRIPTION

Exemplary implementations will be described in detail herein, and examples of these implementations are illustrated in the accompanying drawings. When the following elaborations relate to the accompanying drawings, unless otherwise stated, the same numerals in different accompanying drawings refer to the same or similar elements. The embodiments described in the following exemplary implementations are not intended to represent all embodiments consistent with the implementations of the disclosure. Instead, they are merely examples of methods and apparatuses consistent with some aspects of the disclosure as elaborated in the appended claims. Based on the implementations of the disclosure, all other implementations obtained by those skilled in the art without creative effort shall fall within the protection scope of the disclosure.

Figure 1:
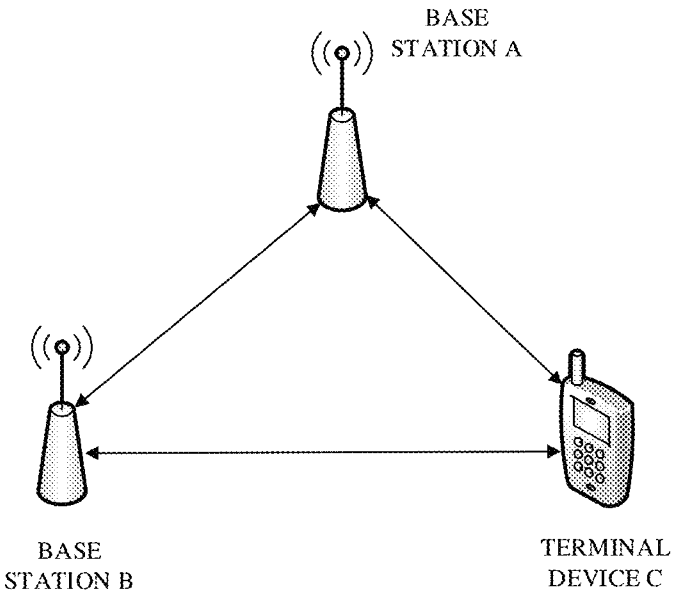
FIG. 1 is a network architectural diagram of a communication system to which implementations of the disclosure are applicable.

FIG. 1 illustrates a system architecture of a communication system to which the following implementations of the disclosure are applicable. The system architecture includes base station A, base station B, and terminal device C.

In order to meet requirements of vertical industries on delay, mobility, reliability, location accuracy, etc., a radio access network (RAN) needs to enhance access-network support for vertical services. One way is based on network slicing. RAN slicing can allow application providers to participate in design, deployment, and operations of a customized RAN, to better support services of the application providers. To this end, release 17 introduces access-network enhancements of slicing.

At present, a RAN-side defines one S-NSSAI (that is, single network slice selection assistance information) for each slice. A user equipment (UE)-side maintains one NSSAI, where the NSSAI is a list of S-NSSAIs. The UE-side can support up to 8 S-NSSAIs.

The S-NSSAI includes a slice/service type (SST) and a slice differentiator (SD), where the SST represents a service type, and the SD represents different UE groups served under the same SST.

In an existing slice handover (HO) procedure, if a target base station does not support a slice that requires switch by a source base station, the target base station will reject a packet data unit (PDU) session corresponding to the slice, which has a technical problem of service discontinuity during slice HO. The following implementations of the disclosure will describe in detail how to implement slice remapping to solve the technical problem of service discontinuity during slice HO.

In the system architecture, the exemplary communication system may be a global system of mobile communication (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a universal mobile telecommunication system (UMTS), a worldwide interoperability for microwave access (WiMAX) communication system, a wireless local area networks (WLAN), a wireless fidelity (WiFi), a next-generation communication system, or other communication systems, etc.

The exemplary communication system specifically includes a network device and a terminal. When the terminal accesses a mobile communication network provided by the network device, the terminal and the network device may be in a communication connection through a wireless link, and a mode of communication connection may be a single connectivity mode, a dual connectivity mode, or a multi-connectivity mode. However, when the mode of communication connection is the single connectivity mode, the network device may be an LTE base station or an NR base station (also called a gNB base station); and when the mode of communication connection is the dual connectivity mode (which may be implemented through a carrier aggregation (CA) technology or multiple network devices). The terminal in implementations of the disclosure may include various devices with wireless communication functions such as handheld devices, in-vehicle devices, wearable devices, computing devices or other processing devices connected to a wireless modem, and various forms of UEs, mobile stations (MS), terminal devices, etc. For the convenience of illustration, the devices mentioned above are collectively referred to as "terminal device".

In addition, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein generally indicates that the associated objects are in an "or" relationship.

It should be understood that, in implementations of the disclosure, "B corresponding to A" indicates that B is associated with A, and B may be determined according to A. However, it should be further understood that, "determine B according to A" does not mean that B is determined according to A only, and B may also be determined according to A and/or other information.

Figure 2:
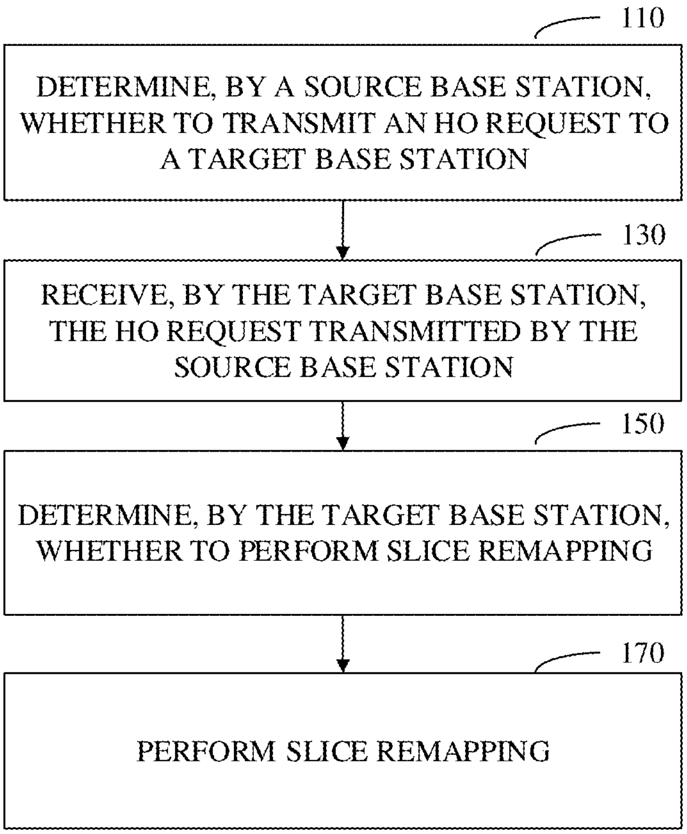
FIG. 2 is a flowchart of a method for network slice handover (HO) according to implementation I of the disclosure.

FIG. 2 is a flowchart of a method for network slice HO according to implementation I of the disclosure. As illustrated in FIG. 2, the method is applicable to a target base station and begin at 130.

At 130, the target base station receives an HO request transmitted by a source base station.

At 150, the target base station determines whether to perform slice remapping.

The HO request indicates that the target base station performs slice HO. When the HO request transmitted by the source base station is received by the target base station, the target base station determines whether to perform slice remapping. The manner of determining whether to perform slice remapping may be that the target base station performs admission control. Optionally, slice remapping may also be slice fallback.

The target base station receives the HO request transmitted by the source base station, and the target base station determines whether to perform slice remapping. As such, upon receiving the HO request transmitted by the source base station, the target base station can determine whether to perform slice remapping. By performing slice remapping at the target base station, it is possible to ensure HO service continuity during slice HO, thereby solving a technical problem of service discontinuity during slice HO.

Optionally, operations at 150 may include the following.

At 1511, according to first slice information, the target base station determines whether to perform slice remapping.

Optionally, operations at 1511 may include the following. If a first condition is satisfied, the target base station determines to perform slice remapping. The first condition is used for the target base station to determine whether to perform slice remapping, and the first condition is determined by the target base station according to the first slice information.

Optionally, operations at 1511 may include the following. Upon determining that the first condition is satisfied according to the first slice information, the target base station determines to perform slice remapping on condition that a slice supported by the target base station is different from a slice that requires switch by a terminal device requesting HO.

According to the first slice information, the target base station determines whether to perform slice remapping. The first slice information may be obtained from an orbital angular momentum (OAM), and/or obtained from an access and mobility management function (AMF), and/or obtained from a neighbouring base station. The target base station determines, according to the first slice information, whether the first condition is satisfied, and/or if the target base station determines that the first condition is satisfied, on condition that the slice supported by the target base station is different from the slice that requires switch by the terminal device requesting HO, the target base station determines to perform slice remapping.

Optionally, the first slice information includes at least one of: a slice support capability of the target base station, a slice supported by the source base station, a slice corresponding to a PDU session currently established by the terminal device at the source base station, a slice supported by the target base station, a service corresponding to a slice corresponding to an original PDU session, a group that a slice corresponding to an original PDU session belongs to (slices in the same group can be remapped to each other), an indication of whether a default slice corresponding to the target base station is supported, whether a PDU session and/or slice that requires switch has a requirement and/or indication for HO service continuity, or whether a PDU session and/or slice that requires switch but is not supported by the target base station is a highest priority service and/or slice.

Optionally, the first condition includes at least one of: the target base station has a slice support capability, where the slice support capability includes a remapping capability; the target base station does not support a slice corresponding to a PDU session requested by the source base station, but supports a default slice; a slice corresponding to a PDU session established at the source base station by the terminal device requesting HO and a slice supported by the target base station have the same SST field, but have different SDs; a slice corresponding to a PDU session established at the source base station by the terminal device requesting HO and a slice supported by the target base station are different, but correspond to a same service; a slice corresponding to a PDU session established at the source base station by the terminal device requesting HO and a slice supported by the target base station are different, but services corresponding to the two slices belong to a same service group; a slice corresponding to a PDU session established at the source base station by the terminal device requesting HO and a slice supported by the target base station are different, but belong to a same slice group; a PDU session and/or slice that requires switch has a requirement and/or indication for HO service continuity; or a PDU session and/or slice that requires switch but is not supported by the target based station is a highest priority service and/or slice.

Optionally, the method may further include the following.

At 170, perform slice remapping.

Optionally, operations at 170 may include the following. A mapping between original PDU sessions and (user) data radio bearers (DRB) is modified into a mapping between new PDU sessions and DRBs.

Figure 3:
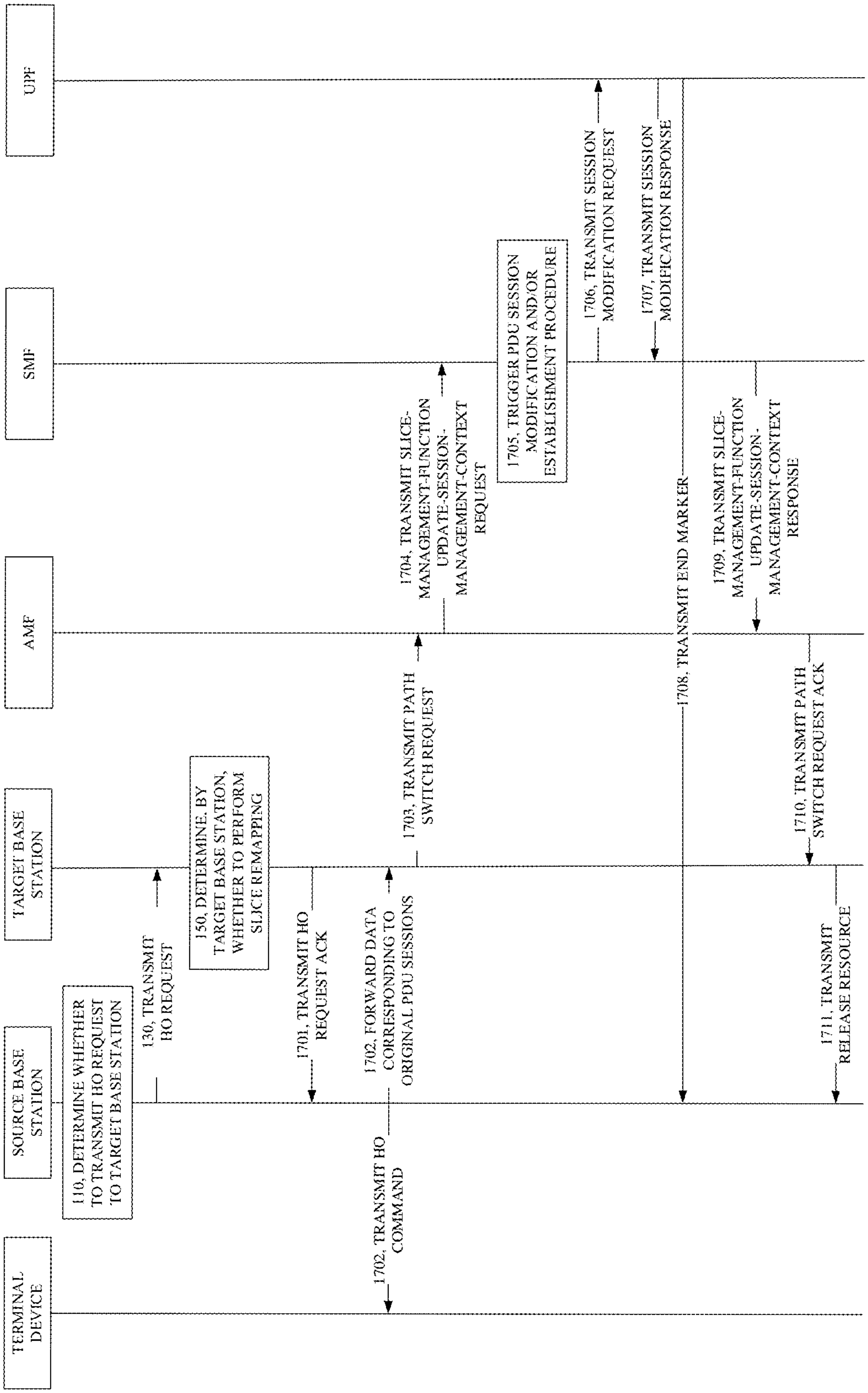
FIG. 3 is a signaling interaction diagram of a method for network slice HO according to implementation I of the disclosure.

Refer to FIG. 3, which is a signaling interaction diagram of a method for network slice HO according to implementation I of the disclosure. As illustrated in FIG. 3, modifying the mapping between original PDU sessions and DRBs into the mapping between new PDU sessions and DRBs may include at least one of the following.

At 1701, the target base station transmits an HO request acknowledge (ACK) to the source base station. The ACK contains new-PDU-session information and/or notifies a data forwarding tunnel for a DRB corresponding to a PDU session to-be-remapped. The new-PDU-session information includes at least one of: a remapping indication, an original-PDU-session identity (ID), a slice corresponding to an original PDU session, a slice corresponding to a new PDU session, a new-PDU-session ID, the mapping between original PDU sessions and DRBs, or the mapping between new PDU sessions and DRB. Optionally, the data forwarding tunnel for the DRB corresponding to the PDU session to-be-remapped may be a data forwarding tunnel for a DRB corresponding to a new PDU session.

At 1702, the source base station forwards data corresponding to the original PDU sessions to the target base station via the data forwarding tunnel, and transmits an HO command to the terminal device requesting HO.

At 1703, the target base station transmits a path switch request to an AMF. The path switch request is N2 path switch request. The path switch request may contain a list of PDU sessions to-be-remapped with a remapping cause per PDU session, where the cause includes slice remapping, and the list includes the original-PDU-session ID and/or the new-PDU-session ID.

At 1704, the AMF transmits a slice-management-function update-session-management-context request (referred to as "Nsmf_PDUSession_UpdateSMContext Request") to a session management function (SMF). The Nsmf_PDUSession_UpdateSMContext Request contains at least one of the list of PDU sessions to-be-remapped (referred to as "PDU session to-be-remapped with a remapping cause"), a PDU session remapping indication (referred to as "PDU session is to be remapped"), or a remapping cause.

At 1705, the SMF triggers a PDU session modification and/or establishment procedure, to modify an existing PDU session and/or add a new PDU session. During triggering, the SMF may notify the terminal device (i.e. UE) to establish a new PDU session.

At 1706, the SMF transmits to a user plane function (UPF) a session modification request (the session modification request is N4 session modification request), to trigger an end marker.

At 1707, the UPF transmits a session modification response to the SMF. The session modification response is N4 session modification response.

At 1708, the UPF transmits the end marker to the source base station.

At 1709, the SMF transmits a slice-management-function update-session-management-context response (referred to as "Nsmf_PDUSession_UpdateSMContext Response") to the AMF, to indicate that the list of PDU sessions is remapped successfully. In addition, the Nsmf_PDUSession_UpdateSMContext Response may indicate a list of PDU sessions that are remapped successfully.

At 1710, the AMF transmits a path switch request ACK to the target base station. The path switch request ACK is N2 path switch request ACK. The path switch request ACK contains a list of remapped PDU sessions (referred to as "remapped-PDU-session list").

At 1711, the target base station transmits a release resource to the source base station after switch succeeds.

Continuing referring to FIG. 3, the method for slice HO may further include the following.

At 110, the source base station determines whether to transmit the HO request to the target base station.

Whether to transmit the HO request to the target base station may be determined in two manners.

Manner 1: operations at 110 includes the following.

At 1111, the source base station determines whether to transmit the HO request to the target base station according to second slice information.

Optionally, operations at 1111 includes the following. The source base station determines, according to the second slice information, whether a second condition is satisfied. The source base station determines whether to transmit the HO request to the target base station.

Optionally, operations at 1111 includes the following. If a second condition is satisfied, the source base station transmits the HO request to the target base station. The second condition is used for the source base station to determine whether to transmit the HO request to the target base station, and the second condition is determined by the source base station according to the second slice information.

Optionally, the second slice information includes at least one of: a slice support capability of the target base station, a slice supported by the source base station, a slice corresponding to a PDU session currently established by the terminal device at the source base station, a slice supported by the target base station, a service corresponding to a slice corresponding to an original PDU session, a group that a slice corresponding to an original PDU session belongs to, or an indication of whether a default slice corresponding to the target base station is supported.

Optionally, the second condition includes at least one of: the target base station has a slice support capability, where the slice support capability may include a remapping capability; existence of an indication that a default slice corresponding to the target base station is supported; a slice supported by the source base station is the same as a slice supported by the target base station, or is a subset of slices supported by the target base station; a slice corresponding to a PDU session currently established by the terminal device at the source base station is the same as a slice supported by the target base station, or is a subset of slices supported by the target base station, or a service corresponding to the slice corresponding to a PDU session currently established by the terminal device at the source base station belongs to a same service group as a service corresponding to the slice supported by the target base station; a service corresponding to a slice supported by the source base station is the same as a service corresponding to a slice supported by the target base station, or is a subset of services corresponding to slices supported by the target base station, or belongs to a same service group as the service corresponding to the slice supported by the target base station; a service corresponding to a slice corresponding to a PDU session currently established by the terminal device at the source base station is the same as a service corresponding to a slice supported by the target base station, or is a subset of services corresponding to slices supported by the target base station; a slice supported by the source base station and a slice supported by the target base station belong to a same group; or a slice corresponding to a PDU session currently established by the terminal device at the source base station and a slice supported by the target base station belong to a same group.

Optionally, the HO request contains remapping information, where the remapping information includes at least one of: a remapping indication, an original-PDU-session ID, a slice corresponding to an original PDU session, a slice corresponding to a new PDU session, a new-PDU-session ID, a mapping between original PDU sessions and DRBs, or a mapping between new PDU sessions and DRBs.

The source base station transmits the HO request to the target base station, if the source base station determines, according to the second slice information, that the second condition is satisfied. The HO request may contain the remapping information. The remapping information includes at least one of: the remapping indication, the original-PDU-session ID, the slice corresponding to an original PDU session, the slice corresponding to a new PDU session, the new-PDU-session ID, the mapping between original PDU sessions and DRBs, or the mapping between new PDU sessions and DRBs (the PDU session may also be replaced by a quality of service (QoS) flow).

Optionally, if a PDU session and/or slice that requires switch has no requirement and/or indication for HO service continuity, and/or a PDU session and/or slice that requires switch but is not supported by the target base station is not a service and/or slice having highest priority, the source base station can still trigger the HO request. The procedure thereof is the same as that of legacy HO.

In manner 1, a condition for determining slice remapping is provided, which ensures efficient implementation of slice remapping and avoids service discontinuity during slice service HO. In addition, a first-round screening by the source base station is introduced, which avoids delay and waste of interface signaling after transmission of the HO request due to non-support for a slice by the target base station.

Manner 2: operations at 110 includes the following.

At 1121, the source base station determines an HO request result according to third slice information, where the third slice information is used for determining the HO request result.

At 1123, determine whether to transmit the HO request to the target base station according to the HO request result. In addition, the HO request may contain the HO request result.

Optionally, the third slice information includes at least one of: a slice support capability of the target base station, a slice supported by the source base station, a slice corresponding to a PDU session currently established by the terminal device at the source base station, a slice supported by the target base station, a service corresponding to a slice corresponding to an original PDU session, a group that a slice corresponding to an original PDU session belongs to, an indication of whether a default slice corresponding to the target base station is supported, whether a PDU session and/or slice that requires switch has a requirement and/or indication for HO service continuity, or whether a PDU session and/or slice that requires switch but is not supported by the target base station is a highest priority service and/or slice.

Optionally, the HO request result includes one of the following. The HO request will be transmitted, where the HO request carries a slice remapping indication. Optionally, the slice remapping indication may be an HO with slice remapping indication. Or, the HO request will be transmitted, where the HO request does not carry the slice remapping indication or carries a no-slice-remapping indication. Optionally, the no-slice-remapping indication is an HO indication and/or an HO without slice remapping indication. Or, the HO request will not be transmitted. Optionally, not transmitting HO request may be implemented as a no-HO indication (referred to as "no HO").

Optionally, determining, according to the HO request result, whether to transmit to the target base station the HO request containing the HO request result at 1123 includes the following.

At 11231, if a third condition is satisfied, the HO request result is transmitting the HO request with the slice remapping indication. The third condition is used for the source base station to determine whether to transmit to the target base station the HO request with the slice remapping indication.

Optionally, the third condition is determined according to the third slice information.

Optionally, if the third condition is satisfied, the HO request result is the HO with slice remapping indication. The source base station determines that slice remapping is needed. In this case, the source base station transmits the HO request to the target base station. The HO request may carry remapping information, where the remapping information includes at least one of: a remapping indication, an original-PDU-session ID, a slice corresponding to an original PDU session, a slice corresponding to a new PDU session, a new-PDU-session ID, a mapping between original PDU sessions and DRBs, or a mapping between new PDU sessions and DRBs (the PDU session may also be replaced by a QoS flow).

At 11233, when the third condition is not satisfied and/or a fourth condition is satisfied, the HO request result is transmitting the HO request without the slice remapping indication or with the no-slice-remapping indication. The no-slice-remapping indication is used for the target base station to determine to perform HO without slice remapping, when an HO request indicating not to perform slice remapping is received by the target base station. The fourth condition is used for the source base station to determine whether to transmit to the target base station the HO request without the slice remapping indication or with the no-slice-remapping indication.

Optionally, the third condition and/or the fourth condition is determined according to the third slice information.

At 11235, when the third condition is not satisfied and/or the fourth condition is not satisfied, the HO request result is not transmitting the HO request. Optionally, the HO request result is the no-HO indication (that is, the source base station does not transmit the HO request to the target base station) if the following condition is satisfied: the target base station does not support a slice, and/or a PDU session and/or slice that requires switch but is not supported by the target base station is not a highest priority service and/or slice, and/or a PDU session and/or slice that requires switch has no requirement and/or indication for HO service continuity.

Optionally, the third condition and/or the fourth condition is determined according to the third slice information.

Optionally, the third condition includes at least one of: the target base station has a slice support capability, where the slice support capability may include a remapping capability; existence of an indication that a default slice corresponding to the target base station is supported; a slice supported by the source base station is the same as a slice supported by the target base station, or is a subset of slices supported by the target base station; a slice corresponding to a PDU session currently established by the terminal device at the source base station is the same as a slice supported by the target base station, or is a subset of slices supported by the target base station; a service corresponding to a slice supported by the source base station is the same as a service corresponding to a slice supported by the target base station, or is a subset of services corresponding to slices supported by the target base station; a service corresponding to a slice corresponding to a PDU session currently established by the terminal device at the source base station is the same as a service corresponding to a slice supported by the target base station, or is a subset of services corresponding to slices supported by the target base station; a slice supported by the source base station and a slice supported by the target base station belongs to a same group; a PDU session and/or slice that requires switch has a requirement and/or indication for HO service continuity; or a PDU session and/or slice that requires switch but is not supported by the target base station is a highest priority service and/or slice.

Optionally, the fourth condition includes at least one of: the target base station does not support a slice, and may have a slicing capability; a slice corresponding to a PDU session currently established by the terminal device at the source base station is the same as a slice supported by the target base station; a PDU session and/or slice that requires switch but is not supported by the target base station is not a highest priority service and/or slice; or a PDU session and/or slice that requires switch has no requirement and/or indication for HO service continuity.

Optionally, "the PDU session and/or slice that requires switch but is not supported by the target base station is not the highest priority service and/or slice and/or the PDU session and/or slice that requires switch has no requirement and/or indication for HO service continuity" further includes the following. A slice corresponding to a PDU session currently established by the terminal device at the source base station is different from a slice supported by the target base station; and/or a service corresponding to a slice corresponding to a PDU session currently established by the terminal device at the source base station is different from a service corresponding to a slice supported by the target base station.

In manner 2, a condition for determining slice remapping as well as specific procedures and details of slice remapping is provided, which ensures efficient implementation of slice remapping and avoids service discontinuity during slice service HO. In addition, a first-round screening by the source base station is further refined. The HO request is transmitted only on condition that the source base station determines that the target base station can perform remapping or the target is required to perform remapping (for example, slice remapping may not be required if a slice that requires switch is not supported by the target base station, and service continuity does not need to be guaranteed), and the target base station is required explicitly to perform slice remapping, which ensures implementation of slice remapping and avoids delay and waste of interface signaling after transmission of the HO request due to the target base station not supporting a slice or no slice remapping being performed. Furthermore, the target base station performs corresponding operations (that is, remapping) only if the source base station determines that remapping is needed, which reduces complexity in implementation of a base station.

Optionally, the target base station may determine whether to perform slice remapping at 150 in one of the following manners.

Manner 1: operations at 150 includes following.

At 1511, according to the first slice information, the target base station determines whether to perform slice remapping.

Manner 2: operations at 150 includes following.

At 1513, if a fifth condition is satisfied, the target base station determines to perform slice remapping.

Specifically, after the HO request is received, the target base station determines to perform slice remapping if the fifth condition is satisfied.

Manner 3: operations at 150 includes following.

At 1513, if a fifth condition is satisfied, the target base station determines to perform slice remapping.

Optionally, if the fifth condition is satisfied, the target base station determines to perform slice remapping at 1513 as follows.

At 15131, upon determining, according to the HO request, that the fifth condition is satisfied, the target base station determines to perform slice remapping.

The target base station determines to perform slice remapping upon determining that the fifth condition is satisfied according to the HO request, where the HO request result is the HO with slice remapping indication.

If the HO request result is no indication, and/or the HO indication, and/or the HO without slice remapping indication, the target base station determines to perform HO without slice remapping.

At 15133, regardless of the HO request result in the HO request, the target base station determines to perform slice remapping if the fifth condition is satisfied.

Optionally, the fifth condition includes at least one of: unconditionally; a slice supported by the target base station is different from a slice that requires switch by the terminal device requesting HO; the target base station has a slice support capability, where the slice support capability includes a remapping capability; the target base station does not support a slice corresponding to a PDU session requested by the source base station, but supports a default slice; a slice corresponding to a PDU session established at the source base station by the terminal device requesting HO and a slice supported by the target base station have the same SST field, but have different SDs; a slice corresponding to a PDU session established at the source base station by the terminal device requesting HO and a slice supported by the target base station are different, but correspond to a same service; a slice corresponding to a PDU session established at the source base station by the terminal device requesting HO and a slice supported by the target base station are different, but services corresponding to the two slices belong to a same service group; or a slice corresponding to a PDU session established at the source base station by the terminal device requesting HO and a slice supported by the target base station are different, but belong to a same slice group.

Optionally, the slice is identified by at least one of an S-NSSAI or a network slice identity (NSID).

Optionally, if a new PDU session is a PDU session that has not been established by the terminal device, since establishment of a new PDU session may fail, operations at 1701 and 1702 need to be performed after operations at 1710. If a new PDU session is a PDU session that has already been established by the terminal device, operations at 1701 and 1702 may remain unchanged in execution order, or may take place after operations at 1710.

If a new PDU session is a PDU session that has not been established by the terminal device, the new PDU session needs to be established, to correspond to a DRB corresponding to an existing original PDU session. If a new PDU session is a PDU session that has already been established by the terminal device, the original PDU session and the DRB will be deleted, and data of the original DRB may be forwarded to a path for the new PDU session and passed to the UPF via N3.

Optionally, all session lists may be slice lists, or a session list contains slice information.

Optionally, remapping may be replaced by fallback. This embodiment provides a condition for determining slice remapping that is selected by the target base station for performing slice remapping, which ensures efficient implementation of slice remapping and avoids service discontinuity during HO of slice services.

According to implementations, the target base station receives the HO request transmitted by the source base station, and the target base station determines whether to perform slice remapping. As such, upon receiving the HO request transmitted by the source base station, the target base station can determine whether to perform slice remapping. By performing slice remapping at the target base station, it is possible to ensure HO service continuity during slice HO, thereby solving a technical problem of service discontinuity during slice HO.

Figure 4:
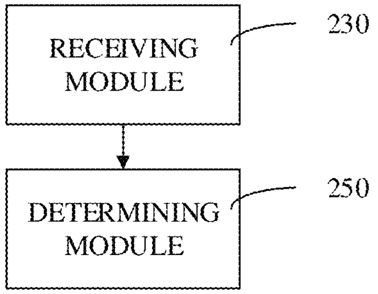
FIG. 4 is a block diagram of an apparatus for network slice HO provided in implementation II of the disclosure.

FIG. 4 is a block diagram of an apparatus for network slice HO provided in implementation II of the disclosure. As illustrated in FIG. 4, the apparatus is a target base station, and may include but is not limited to a receiving module 230 and a determining module 250. The receiving module 230 is configured for the target base station to receive an HO request transmitted by a source base station. The determining module 250 is configured for the target base station to determine whether to perform slice remapping.

Optionally, the determining module 250 is further configured for the target base station to determine whether to perform slice remapping according to first slice information.

Optionally, the determining module 250 is further configured for the target base station to determine to perform slice remapping when a first condition is satisfied. The first condition is used for the target base station to determine whether to perform slice remapping, and the first condition is determined by the target base station according to the first slice information.

Optionally, the determining module 250 is further configured for the target base station to determine to perform slice remapping on condition that a slice supported by the target base station is different from a slice that requires switch by a terminal device requesting HO, upon determining that the first condition is satisfied according to the first slice information.

Optionally, the first slice information includes at least one of: a slice support capability of the target base station, a slice supported by the source base station, a slice corresponding to a PDU session currently established by the terminal device at the source base station, a slice supported by the target base station, a service corresponding to a slice corresponding to an original PDU session, a group that a slice corresponding to an original PDU session belongs to, an indication of whether a default slice corresponding to the target base station is supported, whether a PDU session and/or slice that requires switch has a requirement and/or indication for HO service continuity, or whether a PDU session and/or slice that requires switch but is not supported by the target is a highest priority service and/or slice.

Optionally, the first condition includes at least one of: the target base station has a slice support capability, where the slice support capability includes a remapping capability; the target base station does not support a slice corresponding to a PDU session requested by the source base station, but supports a default slice; a slice corresponding to a PDU session established at the source base station by the terminal device requesting HO and a slice supported by the target base station have the same SST field, but have different SDs; a slice corresponding to a PDU session established at the source base station by the terminal device requesting HO and a slice supported by the target base station are different, but correspond to a same service; a slice corresponding to a PDU session established at the source base station by the terminal device requesting HO and a slice supported by the target base station are different, but services corresponding to the two slices belong to a same service group; a slice corresponding to a PDU session established at the source base station by the terminal device requesting HO and a slice supported by the target base station are different, but belong to a same slice group; a PDU session and/or slice that requires switch has a requirement and/or indication for HO service continuity; or a PDU session and/or slice that requires switch but is not supported by the target is a highest priority service and/or slice.

Optionally, the apparatus further includes a remapping module 270. The remapping module 270 is configured to perform slice remapping.

Optionally, the remapping module 270 is further configured to modify a mapping between original PDU sessions and DRBs into a mapping between new PDU sessions and DRBs.

Optionally, the remapping module 270 is further configured for the target base station to transmit an HO request ACK to the source base station. The ACK contains new-PDU-session information and/or notifies a data forwarding tunnel for a DRB corresponding to a PDU session to-be-remapped, and the new-PDU-session information includes at least one of: a remapping indication, an original-PDU-session ID, a slice corresponding to an original PDU session, a slice corresponding to a new PDU session, a new-PDU-session ID, the mapping between original PDU sessions and DRBs, or the mapping between new PDU sessions and DRBs. The remapping module 270 is further configured for the source base station to forward data corresponding to the original PDU sessions to the target base station via the data forwarding tunnel, and transmit an HO command to the terminal device requesting HO. The remapping module 270 is further configured for the target base station to transmit a path switch request to an AMF. The remapping module 270 is further configured for the AMF to transmit a slice-management-function update-session-management-context request to an SMF. The slice-management-function update-session-management-context request contains at least one of a list of PDU sessions to-be-remapped, a PDU session remapping indication, or a remapping cause. The remapping module 270 is further configured for the SMF to trigger a PDU session modification and/or establishment procedure, to modify an existing PDU session and/or add a new PDU session. The remapping module 270 is further configured for the SMF to transmit a session modification request to a UPF. The remapping module 270 is further configured for the UPF to transmit a session modification response to the SMF. The remapping module 270 is further configured for the UPF to transmit an end marker to the source base station. The remapping module 270 is further configured for the SMF to transmit a slice-management-function update-session-management-context response to the AMF, to indicate that the list of PDU sessions is remapped successfully. The remapping module 270 is further configured for the target base station to receive a path switch request ACK transmitted by the AMF, where the path switch request ACK contains a list of remapped PDU sessions. The remapping module 270 is further configured for the target base station to transmit a release resource to the source base station after switch succeeds.

Optionally, the apparatus may further include, but is not limited to, a transmission-determining module 210. The transmission-determining module 210 is configured for the source base station to determine whether to transmit the HO request to the target base station.

Optionally, the transmission-determining module 210 is further configured for the source base station to determine whether to transmit the HO request to the target base station according to second slice information.

Optionally, the transmission-determining module 210 is further configured for the source base station to transmit the HO request to the target base station when a second condition is satisfied. The second condition is used for the source base station to determine whether to transmit the HO request to the target base station, and the second condition is determined by the source base station according to the second slice information.

Optionally, the second slice information includes at least one of: a slice support capability of the target base station, a slice supported by the source base station, a slice corresponding to a PDU session currently established by the terminal device at the source base station, a slice supported by the target base station, a service corresponding to a slice corresponding to an original PDU session, a group that a slice corresponding to an original PDU session belongs to, or an indication of whether a default slice corresponding to the target base station is supported.

Optionally, the second condition includes at least one of: the target base station has a slice support capability; existence of an indication that a default slice corresponding to the target base station is supported; a slice supported by the source base station is the same as a slice supported by the target base station, or is a subset of slices supported by the target base station; a slice corresponding to a PDU session currently established by the terminal device at the source base station is the same as a slice supported by the target base station, or is a subset of slices supported by the target base station, or belongs to a same service group as a service corresponding to the slice supported by the target base station; a service corresponding to a slice supported by the source base station is the same as a service corresponding to a slice supported by the target base station, or is a subset of services corresponding to slices supported by the target base station, or a service corresponding to the slice corresponding to a PDU session currently established by the terminal device at the source base station belongs to a same service group as the service corresponding to the slice supported by the target base station; a service corresponding to a slice corresponding to a PDU session currently established by the terminal device at the source base station is the same as a service corresponding to a slice supported by the target base station, or is a subset of services corresponding to slices supported by the target base station; a slice supported by the source base station and a slice supported by the target base station belong to a same group; or a slice corresponding to a PDU session currently established by the terminal device at the source base station and a slice supported by the target base station belong to a same group.

Optionally, the HO request contains remapping information, where the remapping information includes at least one of: a remapping indication, an original-PDU-session ID, a slice corresponding to an original PDU session, a slice corresponding to a new PDU session, a new-PDU-session ID, a mapping between original PDU sessions and DRBs, or a mapping between new PDU sessions and DRBs.

Optionally, the transmission-determining module 210 is further configured for the source base station to determine an HO request result according to third slice information, where the third slice information is used for determining the HO request result. The transmission-determining module 210 is further configured to determine, according to the HO request result, whether to transmit the HO request to the target base station, where the HO request contains the HO request result.

Optionally, the third slice information includes at least one of: a slice support capability of the target base station, a slice supported by the source base station, a slice corresponding to a PDU session currently established by the terminal device at the source base station, a slice supported by the target base station, a service corresponding to a slice corresponding to an original PDU session, a group that a slice corresponding to an original PDU session belongs to, an indication of whether a default slice corresponding to the target base station is supported, whether a PDU session and/or slice that requires switch has a requirement and/or indication for HO service continuity, or whether a PDU session and/or slice that requires switch but is not supported by the target is a highest priority service and/or slice.

Optionally, the HO request result includes one of: transmitting the HO request with a slice remapping indication, transmitting the HO request without the slice remapping indication or with a no-slice-remapping indication, or not transmitting the HO request.

Optionally, the transmission-determining module 210 is further configured to, when a third condition is satisfied, the HO request result is transmitting the HO request with the slice remapping indication. The third condition is used for the source base station to determine whether to transmit to the target base station the HO request with the slice remapping indication. The transmission-determining module 210 is further configured to, when the third condition is not satisfied and/or a fourth condition is satisfied, the HO request result is transmitting the HO request without the slice remapping indication or with the no-slice-remapping indication. The no-slice-remapping indication is used for the target base station to determine to perform HO without slice remapping when an HO request without slice remapping is received by the target base station. The fourth condition is used for the source base station to determine whether to transmit to the target base station the HO request without the slice remapping indication or with the no-slice-remapping indication. The transmission-determining module 210 is further configured to, when the third condition is not satisfied and/or the fourth condition is not satisfied, the HO request result is not transmitting the HO request.

Optionally, the third condition includes at least one of: the target base station has a slice support capability; existence of an indication that a default slice corresponding to the target base station is supported; a slice supported by the source base station is the same as a slice supported by the target base station, or is a subset of slices supported by the target base station; a slice corresponding to a PDU session currently established by the terminal device at the source base station is the same as a slice supported by the target base station, or is a subset of slices supported by the target base station; a service corresponding to a slice supported by the source base station is the same as a service corresponding to a slice supported by the target base station, or is a subset of services corresponding to slices supported by the target base station; a service corresponding to a slice corresponding to a PDU session currently established by the terminal device at the source base station is the same as a service corresponding to a slice supported by the target base station, or is a subset of services corresponding to slices supported by the target base station; a slice supported by the source base station and a slice supported by the target base station belongs to a same group; a PDU session and/or slice that requires switch has a requirement and/or indication for HO service continuity; or a PDU session and/or slice that requires switch but is not supported by the target is a highest priority service and/or slice.

Optionally, the fourth condition includes at least one of: the target base station does not support a slice; a slice corresponding to a PDU session currently established by the terminal device at the source base station is the same as a slice supported by the target base station; a PDU session and/or slice that requires switch but is not supported by the target is not a highest priority service and/or slice; or a PDU session and/or slice that requires switch has no requirement and/or indication for HO service continuity.

Optionally, the PDU session and/or slice that requires switch but is not supported by the target is not the highest priority service and/or slice and/or the PDU session and/or slice that requires switch has no requirement and/or indication for HO service continuity further includes the following. A slice corresponding to a PDU session currently established by the terminal device at the source base station is different from a slice supported by the target base station, and/or a service corresponding to a slice corresponding to a PDU session currently established by the terminal device at the source base station is different from a service corresponding to a slice supported by the target base station.

Optionally, the determining module 250 is further configured for the target base station to determine to perform slice remapping when a fifth condition is satisfied, where the fifth condition is used for the target base station to determine whether to perform slice remapping.

Optionally, the fifth condition includes at least one of: unconditionally; a slice supported by the target base station is different from a slice that requires switch by the terminal device requesting HO; the target base station has a slice support capability, where the slice support capability includes a remapping capability; the target base station does not support a slice corresponding to a PDU session requested by the source base station, but supports a default slice; a slice corresponding to a PDU session established at the source base station by the terminal device requesting HO and a slice supported by the target base station have the same SST field, but have different SDs; a slice corresponding to a PDU session established at the source base station by the terminal device requesting HO and a slice supported by the target base station are different, but correspond to a same service; a slice corresponding to a PDU session established at the source base station by the terminal device requesting HO and a slice supported by the target base station are different, but services corresponding to the two slices belong to a same service group; or a slice corresponding to a PDU session established at the source base station by the terminal device requesting HO and a slice supported by the target base station are different, but belong to a same slice group.

Optionally, the slice is identified by at least one of an S-NSSAI or an NSID.

For the implementation process of the function and role of each module and other parts that are not described or defined in detail in this embodiment, reference can be made to the elaboration in implementation I, which will not be repeated herein.

Figure 5:
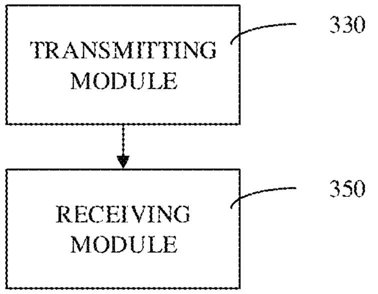
FIG. 5 is a block diagram of an apparatus for network slice HO provided in implementation III of the disclosure.

FIG. 5 is a block diagram of an apparatus for network slice HO provided in implementation III of the disclosure. As illustrated in FIG. 5, the apparatus is a source base station. The apparatus may include but is not limited to a transmitting module 330 and a receiving module 350. The transmitting module 330 is configured for the source base station to transmit an HO request to a target base station. The HO request is used for the target base station to determine whether to perform slice remapping when the HO request is received by the target base station. The receiving module 350 is configured for the source base station to receive an HO request ACK fed back by the target base station. The HO request ACK contains new-PDU-session information and/or notifies a data forwarding tunnel for a DRB corresponding to a PDU session to-be-remapped.

Optionally, the apparatus may further include but is not limited to a determining module 310. The determining module 310 is configured for the source base station to determine whether to transmit the HO request to the target base station.

Optionally, the determining module 310 is further configured for the source base station to determine whether to transmit the HO request to the target base station according to second slice information.

Optionally, the determining module 310 is further configured for the source base station to transmit the HO request to the target base station if a second condition is satisfied. The second condition is used for the source base station to determine whether to transmit the HO request to the target base station, and the second condition is determined by the source base station according to the second slice information.

Optionally, the determining module 310 is further configured for the source base station to determine an HO request result according to third slice information, where the third slice information is used for determining the HO request result. The determining module 310 is further configured to determine, according to the HO request result, whether to transmit the HO request to the target base station, where the HO request contains the HO request result.

Optionally, the transmitting module 330 is further configured to forward data corresponding to an original PDU session to the target base station via the data forwarding tunnel, and transmit an HO command to a terminal device requesting HO. Optionally, the receiving module 350 is further configured to receive an end marker transmitted by a UPF, and receive a release resource transmitted by the target base station.

For the implementation process of the function and role of each module and other parts that are not described or defined in detail in this embodiment, reference can be made to the elaboration in implementation I, which will not be repeated herein.

Figure 6:
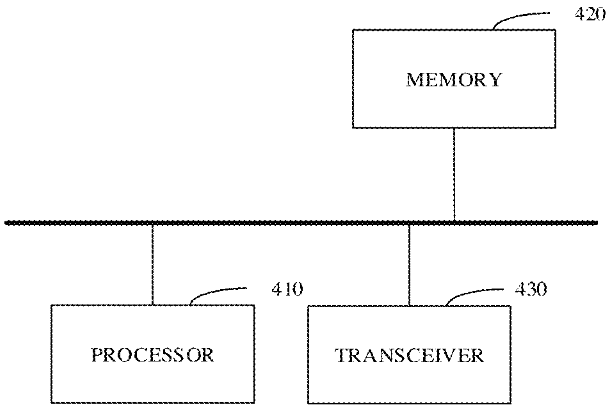
FIG. 6 is a hardware structural diagram of an apparatus for network slice HO provided in implementation IV of the disclosure.

FIG. 6 is a hardware structural diagram of an apparatus for network slice HO provided in implementation IV of the disclosure. As illustrated in FIG. 6, the apparatus includes a processor 410, a memory 420, and a transceiver 430 such as a communication interface, an antenna, a transmitter, or a receiver. The various assemblies above of the apparatus are in a communication connection with each other via a bus system.

The memory 420 is configured to store programs executable by the processor 410.

The processor 410, when executing the programs, implements some or all operations of the foregoing method for network slice HO in implementation I of the disclosure.

The processor 410 may be a separate component, or may be a collective term for multiple processing components. For example, the processor 410 may be a central processing unit (CPU), or may be an application specific integrated circuit (ASIC), or may be one or more integrated circuits configured to implement the foregoing method such as at least one microprocessor (e.g. digital signal processor (DSP)) or at least one field programmable gate array (FPGA), etc.

The steps of the method or algorithm described in implementations of the disclosure may be implemented by means of hardware, or may be implemented by executing software instructions by a processor. The software instructions can be implemented by corresponding software modules, which can be stored in a random access memory (RAM), a flash memory, a read only memory (ROM), an erasable programmable ROM (EPROM), an electrically EPROM (EEPROM), registers, hard disk, mobile hard disk, compact disc (CD)-ROM, or any other form of storage medium known in the art. An exemplary storage medium is coupled to the processor, such that the processor can read information from the storage medium and write information to the storage medium. The storage medium can also be a component of the processor. The processor and the storage medium may be located in an ASIC. In addition, the ASIC can be located in an access-network device, a target network device, or a core-network device. The processor and the storage medium may also be present as discrete components in the access-network device, the target network device, or the core-network device.

Those skilled in the art will appreciate that, all or part of functions described in implementations of the disclosure can be implemented through software, hardware, firmware, or any other combination thereof. When implemented by software, all or part of the functions can be implemented in the form of a computer program product. The computer program product includes one or more computer instructions. When the computer instructions are applied and executed on a computer, all or part of the operations or functions of the implementations of the disclosure are performed. The computer can be a general-purpose computer, a special-purpose computer, a computer network, or other programmable apparatuses. The computer instruction can be stored in a computer-readable storage medium, or transmitted from one computer-readable storage medium to another computer-readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer-readable storage medium can be any computer accessible usable-medium or a data storage device such as a server, a data center, or the like which integrates one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

The implementations described above describe in further detail purposes, technical solutions and advantages of the implementations of the disclosure. It should be understood that, the above is only specific embodiments of implementations of the disclosure, and are not used to limit the protection scope of implementations of the disclosure. Any modification, equivalent substitution, improvement, and the like that is made on the basis of technical solutions of implementations of the disclosure shall be included in the protection scope of implementations of the disclosure.

It should be understood that, the disclosure is not limited to the specific structures already described above and illustrated in the accompanying drawings, and that various modifications and changes may be made without departing from the scope of the disclosure. The scope of the disclosure is limited only by the appended claims.

What is claimed is:

1. A method for network slice handover (HO), performed by a target base station and comprising:

receiving, by the target base station, an HO request transmitted by a source base station, wherein whether to transmit the HO request to the target base station is determined by the source base station according to an HO request result, and the HO request contains the HO request result, wherein the HO request result is determined by the source base station according to third slice information, and the third slice information comprises: a slice corresponding to a PDU session currently established by a terminal device at the source base station, a service corresponding to a slice corresponding to an original PDU session, and whether a PDU session and/or slice that requires switch has a requirement and/or indication for HO service continuity;

determining, by the target base station, to perform slice remapping when a first condition is satisfied, wherein the first condition is determined by the target base station according to first slice information, wherein the first slice information is obtained by the target base station from an access and mobility management function (AMF) and/or a neighbouring base station; and performing slice remapping, comprising: modifying a mapping between original PDU sessions and data radio bearers (DRB) into a mapping between new PDU sessions and DRBs;

wherein the first slice information comprises: whether a packet data unit (PDU) session and/or slice that requires switch has a requirement for HO service continuity; and the first condition comprises: the PDU session and/or slice that requires switch has a requirement for HO service continuity.

2. The method of claim 1, wherein the first slice information comprises at least one of:

a slice support capability of the target base station;

a slice supported by the source base station;

a slice corresponding to a PDU session currently established by the terminal device at the source base station;

a slice supported by the target base station;

a service corresponding to a slice corresponding to an original PDU session;

a group that a slice corresponding to an original PDU session belongs to;

an indication of whether a default slice corresponding to the target base station is supported;

whether a PDU session and/or slice that requires switch has an indication for HO service continuity; or whether a PDU session and/or slice that requires switch but is not supported by the target is a highest priority service and/or slice.

3. The method of claim 2, wherein the first condition comprises at least one of:

the target base station has a slice support capability, wherein the slice support capability comprises a remapping capability;

the target base station does not support a slice corresponding to a PDU session requested by the source base station, but supports a default slice;

a slice corresponding to a PDU session established at the source base station by the terminal device requesting HO and a slice supported by the target base station have a same slice/service type (SST) field, but have different slice differentiators (SD);

a slice corresponding to a PDU session established at the source base station by the terminal device requesting HO and a slice supported by the target base station are different, but correspond to a same service;

a slice corresponding to a PDU session established at the source base station by the terminal device requesting HO and a slice supported by the target base station are different, but services corresponding to the two slices belong to a same service group;

a slice corresponding to a PDU session established at the source base station by the terminal device requesting HO and a slice supported by the target base station are different, but belong to a same slice group;

a PDU session and/or slice that requires switch has an indication for HO service continuity; or a PDU session and/or slice that requires switch but is not supported by the target is a highest priority service and/or slice.

4. The method of claim 1, wherein modifying the mapping between original PDU sessions and DRBs into the mapping between new PDU sessions and DRBs comprises at least one of:

transmitting, by the target base station, an HO request acknowledge (ACK) to the source base station, wherein the ACK contains new-PDU-session information and/or notifies a data forwarding tunnel for a DRB corresponding to a PDU session to-be-remapped, and the new-PDU-session information comprises at least one of: a remapping indication, an original-PDU-session identity (ID), a slice corresponding to an original PDU session, a slice corresponding to a new PDU session, a new-PDU-session ID, the mapping between original PDU sessions and DRBs, or the mapping between new PDU sessions and DRBs;

data corresponding to the original PDU sessions is forwarded to the target base station by the source base station via the data forwarding tunnel, and an HO command is transmitted to a terminal device requesting HO by the source base station;

transmitting, by the target base station, a path switch request to an access and mobility management function (AMF);

a slice-management-function update-session-management-context request is transmitted by the AMF to a session management function (SMF), wherein the slice-management-function update-session-management-context request contains at least one of a list of PDU sessions to-be-remapped, a PDU session remapping indication, or a remapping cause;

a PDU session modification and/or establishment procedure is triggered by the SMF, to modify an existing PDU session and/or add a new PDU session;

a session modification request is transmitted by the SMF to a user plane function (UPF);

a session modification response is transmitted by the UPF to the SMF;

an end marker is transmitted by the UPF to the source base station;

a slice-management-function update-session-management-context response is transmitted by the SMF to the AMF, to indicate that the list of PDU sessions is remapped successfully;

receiving, by the target base station, a path switch request ACK transmitted by the AMF, wherein the path switch request ACK contains a list of remapped PDU sessions; or transmitting, by the target base station, a release resource to the source base station after switch succeeds.

5. The method of claim 1, wherein the HO request result comprises one of:

transmitting the HO request with a slice remapping indication;

transmitting the HO request without the slice remapping indication or with a no-slice-remapping indication; or not transmitting the HO request.

6. The method of claim 5, wherein determining, according to the HO request result, to transmit the HO request to the target base station comprises:

when a third condition is satisfied, the HO request result is transmitting the HO request with the slice remapping indication, wherein the third condition is used for the source base station to determine whether to transmit to the target base station the HO request with the slice remapping indication;

when the third condition is not satisfied and/or a fourth condition is satisfied, the HO request result is transmitting the HO request without the slice remapping indication or with the no-slice-remapping indication, wherein the no-slice-remapping indication is used for the target base station to determine to perform HO without slice remapping when an HO request without slice remapping is received by the target base station, and the fourth condition is used for the source base station to determine whether to transmit to the target base station the HO request without the slice remapping indication or with the no-slice-remapping indication;

when the third condition is not satisfied and/or the fourth condition is not satisfied, the HO request result is not transmitting the HO request.

7. The method of claim 6, wherein the third condition comprises at least one of:

the target base station has a slice support capability;

existence of an indication that a default slice corresponding to the target base station is supported;

a slice supported by the source base station is same as a slice supported by the target base station, or is a subset of slices supported by the target base station;

a slice corresponding to a PDU session currently established by the terminal device at the source base station is same as a slice supported by the target base station, or is a subset of slices supported by the target base station;

a service corresponding to a slice supported by the source base station is same as a service corresponding to a slice supported by the target base station, or is a subset of services corresponding to slices supported by the target base station;

a service corresponding to a slice corresponding to a PDU session currently established by the terminal device at the source base station is same as a service corresponding to a slice supported by the target base station, or is a subset of services corresponding to slices supported by the target base station;

a slice supported by the source base station and a slice supported by the target base station belongs to a same group;

a PDU session and/or slice that requires switch has a requirement and/or indication for HO service continuity; or a PDU session and/or slice that requires switch but is not supported by the target base station is a highest priority service and/or slice.

8. The method of claim 6, wherein the fourth condition comprises at least one of:

the target base station does not support a slice;

a slice corresponding to a PDU session currently established by the terminal device at the source base station is same as a slice supported by the target base station;

a PDU session and/or slice that requires switch but is not supported by the target base station is not a highest priority service and/or slice; or a PDU session and/or slice that requires switch has no requirement and/or indication for HO service continuity.

9. The method of claim 8, wherein the PDU session and/or slice that requires switch but is not supported by the target base station is not the highest priority service and/or slice and/or the PDU session and/or slice that requires switch has no requirement and/or indication for HO service continuity further comprises:

a slice corresponding to a PDU session currently established by the terminal device at the source base station is different from a slice supported by the target base station; and/or a service corresponding to a slice corresponding to a PDU session currently established by the terminal device at the source base station is different from a service corresponding to a slice supported by the target base station.

10. A method for network slice handover (HO), performed by a source base station and comprising:

determining, by the source base station, an HO request result according to third slice information, wherein the third slice information is used for determining the HO request result and comprises: a slice corresponding to a PDU session currently established by a terminal device at the source base station, a service corresponding to a slice corresponding to an original PDU session, and whether a PDU session and/or slice that requires switch has a requirement and/or indication for HO service continuity; and determining, according to the HO request result, whether to transmit the HO request to a target base station, wherein the HO request contains the HO request result;

transmitting, by the source base station, the HO request to the target base station, the HO request being used for triggering the target base station to determine whether to perform slice remapping when the HO request is received by the target base station, wherein slice remapping is determined to be performed by the target base station when a first condition is satisfied, and the first condition is determined by the target base station according to first slice information, wherein the first slice information is obtained by the target base station from an access and mobility management function (AMF) and/or a neighbouring base station, wherein the first slice information comprises: whether a packet data unit (PDU) session and/or slice that requires switch has a requirement for HO service continuity, and the first condition comprises: a PDU session and/or slice that requires switch has a requirement for HO service continuity, wherein to perform slice remapping refers to modify a mapping between original PDU sessions and data radio bearers (DRB) into a mapping between new PDU sessions and DRBs; and receiving, by the source base station, an HO request acknowledge (ACK) fed back by the target base station, the HO request ACK containing new PDU session information and/or notifying a data forwarding tunnel for a DRB corresponding to a PDU session to-be-remapped.

11. The method of claim 10, wherein after receiving, by the source base station, the HO request ACK fed back by the target base station, the method further comprises:

forwarding data corresponding to an original PDU session to the target base station via the data forwarding tunnel;

transmitting an HO command to the terminal device requesting HO;

receiving an end marker transmitted by a user plane function (UPF); and receiving a release resource transmitted by the target base station.

12. The method of claim 10, wherein the HO request result comprises one of:

transmitting the HO request with a slice remapping indication;

transmitting the HO request without the slice remapping indication or with a no-slice-remapping indication; or not transmitting the HO request.

13. The method of claim 12, wherein determining, according to the HO request result, whether to transmit the HO request to the target base station comprises:

when a third condition is satisfied, the HO request result is transmitting the HO request with the slice remapping indication, wherein the third condition is used for the source base station to determine whether to transmit to the target base station the HO request with the slice remapping indication;

when the third condition is not satisfied and/or a fourth condition is satisfied, the HO request result is transmitting the HO request without the slice remapping indication or with the no-slice-remapping indication, wherein the no-slice-remapping indication is used for the target base station to determine to perform HO without slice remapping when an HO request without slice remapping is received by the target base station, and the fourth condition is used for the source base station to determine whether to transmit to the target base station the HO request without the slice remapping indication or with the no-slice-remapping indication;

when the third condition is not satisfied and/or the fourth condition is not satisfied, the HO request result is not transmitting the HO request.

14. The method of claim 13, wherein the third condition comprises at least one of:

the target base station has a slice support capability;

existence of an indication that a default slice corresponding to the target base station is supported;

a slice supported by the source base station is same as a slice supported by the target base station, or is a subset of slices supported by the target base station;

a slice corresponding to a PDU session currently established by the terminal device at the source base station is same as a slice supported by the target base station, or is a subset of slices supported by the target base station;

a service corresponding to a slice supported by the source base station is same as a service corresponding to a slice supported by the target base station, or is a subset of services corresponding to slices supported by the target base station;

a service corresponding to a slice corresponding to a PDU session currently established by the terminal device at the source base station is same as a service corresponding to a slice supported by the target base station, or is a subset of services corresponding to slices supported by the target base station;

a slice supported by the source base station and a slice supported by the target base station belongs to a same group;

a PDU session and/or slice that requires switch has a requirement and/or indication for HO service continuity; or a PDU session and/or slice that requires switch but is not supported by the target base station is a highest priority service and/or slice.

15. The method of claim 13, wherein the fourth condition comprises at least one of:

the target base station does not support a slice;

a slice corresponding to a PDU session currently established by the terminal device at the source base station is same as a slice supported by the target base station;

a PDU session and/or slice that requires switch but is not supported by the target base station is not a highest priority service and/or slice; or a PDU session and/or slice that requires switch has no requirement and/or indication for HO service continuity.

16. The method of claim 15, wherein the PDU session and/or slice that requires switch but is not supported by the target base station is not the highest priority service and/or slice and/or the PDU session and/or slice that requires switch has no requirement and/or indication for HO service continuity further comprises:

a slice corresponding to a PDU session currently established by the terminal device at the source base station is different from a slice supported by the target base station; and/or a service corresponding to a slice corresponding to a PDU session currently established by the terminal device at the source base station is different from a service corresponding to a slice supported by the target base station.

17. A base station, being a target base station and comprising:

a transceiver;

a processor; and a memory storing programs which, when executed by the processor, are operable with the processor to:

cause the transceiver to receive a handover (HO) request transmitted by a source base station, wherein whether to transmit the HO request to the target base station is determined by the source base station according to an HO request result, and the HO request contains the HO request result, wherein the HO request result is determined by the source base station according to third slice information, and the third slice information comprises: a slice corresponding to a PDU session currently established by a terminal device at the source base station, a service corresponding to a slice corresponding to an original PDU session, and whether a PDU session and/or slice that requires switch has a requirement and/or indication for HO service continuity; and determine to perform slice remapping when a first condition is satisfied, wherein the first condition is determined by the processor according to first slice information, wherein the first slice information is obtained by the target base station from an access and mobility management function (AMF) and/or a neighbouring base station; and perform slice remapping, comprising: modify a mapping between original PDU sessions and data radio bearers (DRB) into a mapping between new PDU sessions and DRBs; wherein the first slice information comprises: whether a packet data unit (PDU) session and/or slice that requires switch has a requirement for HO service continuity; and the first condition comprises: the PDU session and/or slice that requires switch has a requirement for HO service continuity.

* * * * *